United States Patent

[11] 3,617,022

[72] Inventor William H. Wiggins
 c/o Embryon Company, 50A Soudan Avenue, Toronto 7, Ontario, Canada
[21] Appl. No. 817,864
[22] Filed Apr. 21, 1969
[45] Patented Nov. 2, 1971
[32] Priority Mar. 25, 1969
[33] Canada
[31] 046,627

[54] COOKING DEVICE
3 Claims, 6 Drawing Figs.
[52] U.S. Cl. .................................................. 248/158, 108/150, 126/25
[51] Int. Cl. ..................................................... F16m 13/00
[50] Field of Search ........................................... 248/159, 158, 127; 108/150; 232/43.5; 312/254

[56] References Cited
UNITED STATES PATENTS

| | | | |
|---|---|---|---|
| 568,396 | 9/1896 | Birdsell ........................ | 248/159 |
| 971,371 | 9/1910 | Hale ............................. | 248/159 |
| 1,709,933 | 4/1929 | Cowan ........................ | 151/38 |
| 1,744,425 | 1/1930 | Wanner ....................... | 248/158 |
| 1,802,279 | 4/1931 | Schmitt ....................... | 248/158 |
| 2,000,920 | 5/1935 | Campbell ..................... | 312/254 |
| 2,146,112 | 2/1939 | Erickson ...................... | 248/159 |
| 2,981,578 | 4/1961 | Saarinen ...................... | 108/150 |
| 3,253,524 | 10/1964 | Greenfield et al. ........... | 248/158 |
| 3,399,269 | 8/1968 | Willox .......................... | 151/38 |

Primary Examiner—Marion Parsons, Jr.
Attorney—Douglas S. Johnson

ABSTRACT: A cooking device comprising upper and lower hemispheres wherein the peripheral rim of the lower hemisphere is tilted at an angle to the axis of a pedestal support to which it is rigidly secured. The upper hemisphere is rotatably mounted on the lower hemisphere so as to rotate about a common axis of each, and is dimensioned so as to rotate without interference over at least a portion of the outer surface of the lower hemisphere. Stop means are provided to preclude rotation of the upper hemisphere in the other direction over the lower hemisphere so that the upper hemisphere forms a hood for the lower hemisphere. Pedestal means are provided comprising a tension-compression structure wherein a tube having flared ends is subjected to compression forces by tightening a threaded tension rod within the tube.

PATENTED NOV 2 1971 3,617,022

WILLIAM H. WIGGINS
*INVENTOR.*

BY *Douglas S. Johnson*

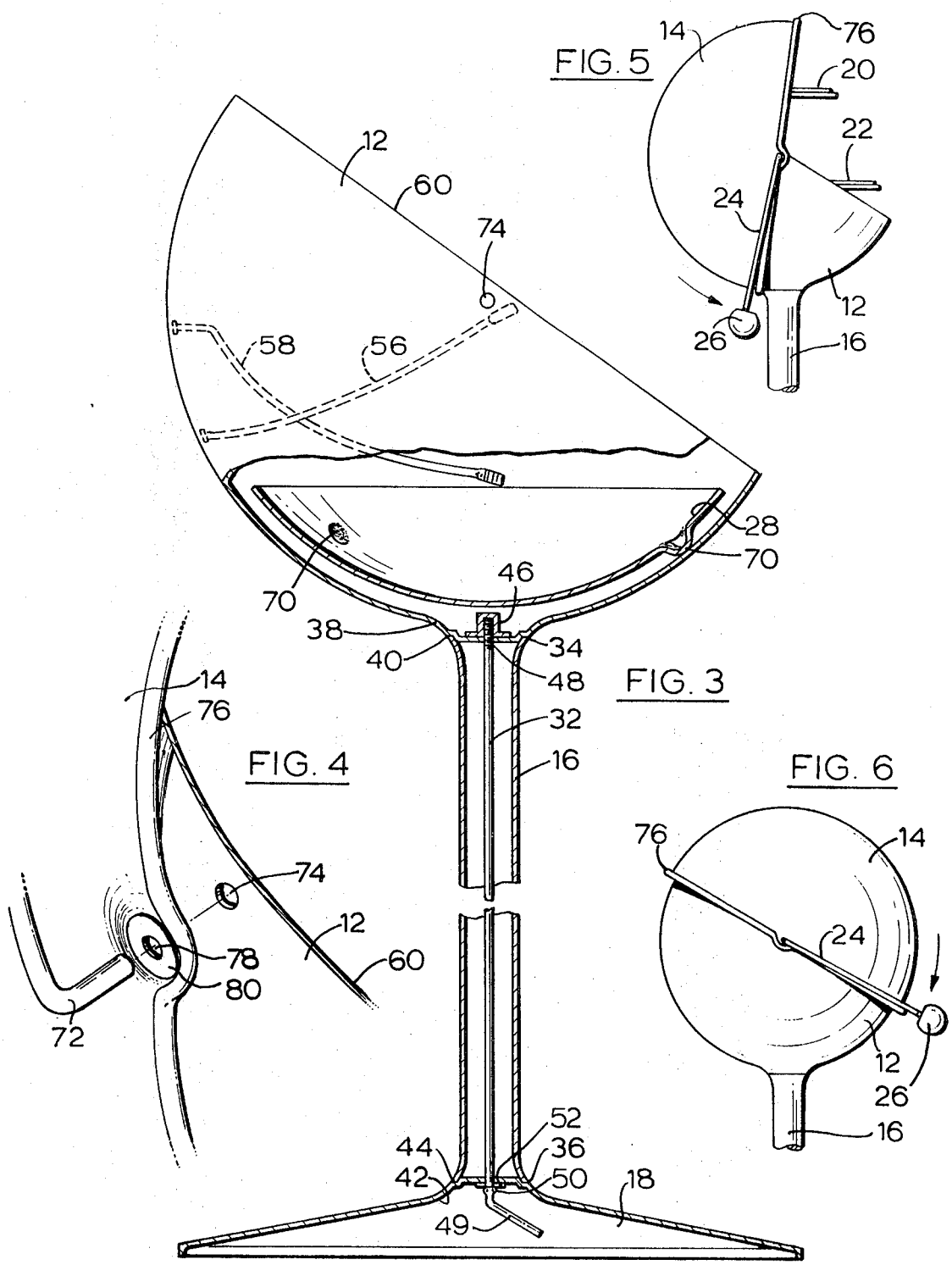

3,617,022

COOKING DEVICE

FIELD OF THE INVENTION

This invention relates to a cooking device, more particularly cooking devices of the sort known generally as barbecues.

Outdoor cooking has become very popular, and many cooking devices known generally as barbecues are available on the market. Such devices most often comprise a shallow pan in which a fire of charcoal or like material is laid, and above which there is a grill on which the food to be cooked may be placed. Usually, there is a device to raise or lower the grill on which the food is cooking with respect to the level of the fire, and most often such elevating devices comprise elevatable means for supporting the bottom end of a post from which the grill is cantilevered. In yet other barbecues, means are provided for raising and lowering the fire pan itself with respect to the grill, but such cooking devices are understandably quite expensive. Still other barbecues of the "kettle" type are available, having a domed cover which can be removed, and in which cover provision is made for controlling the draught within the cooking device and thereby controlling the rate at which the fire burns. Most of the known barbecue devices presently on the market are supported on three or four legs, and often difficulty is encountered in leveling the barbecue because of its means of support.

SUMMARY OF THE INVENTION

It is an object of this invention to provide a cooking device which may be used both as an open barbecue and a "kettle" type cooker.

It is another object of this invention to provide a cooking device which may be inexpensively manufactured and easily assembled.

Yet another object of this invention is to provide a single, pedestal support.

Still another object of this invention is to provide a cooking device having novel means for raising and lowering the level of a cooking grill with respect to the level of the fire beneath it.

A still further object of this invention is to provide a cooking device having a separate fire pan in which the fire can be started away from the cooking device and placed therein after fire is established, and in which a proper draught can be assured with much less possibility of damage to the material of the cooking device.

BRIEF DESCRIPTION OF THE DRAWINGS

These and other objects and features of the invention are more clearly described below in association with the accompanying drawings, in which:

FIG. 3 is a cross-sectional view taken through the center of the cooking device of FIG. 1 in the direction of arrows 3—3 but with the hood removed;

FIG. 4 is a detail showing the assembly of the hood to the lower bowl of the cooking device;

FIG. 5 is a partial side view of the cooking device showing the hood in its fully opened position; and FIG. 6 is a partial side view of the cooking device showing the hood in its fully closed position.

DESCRIPTION OF THE PREFERRED EMBODIMENT

Figures 1, 2:
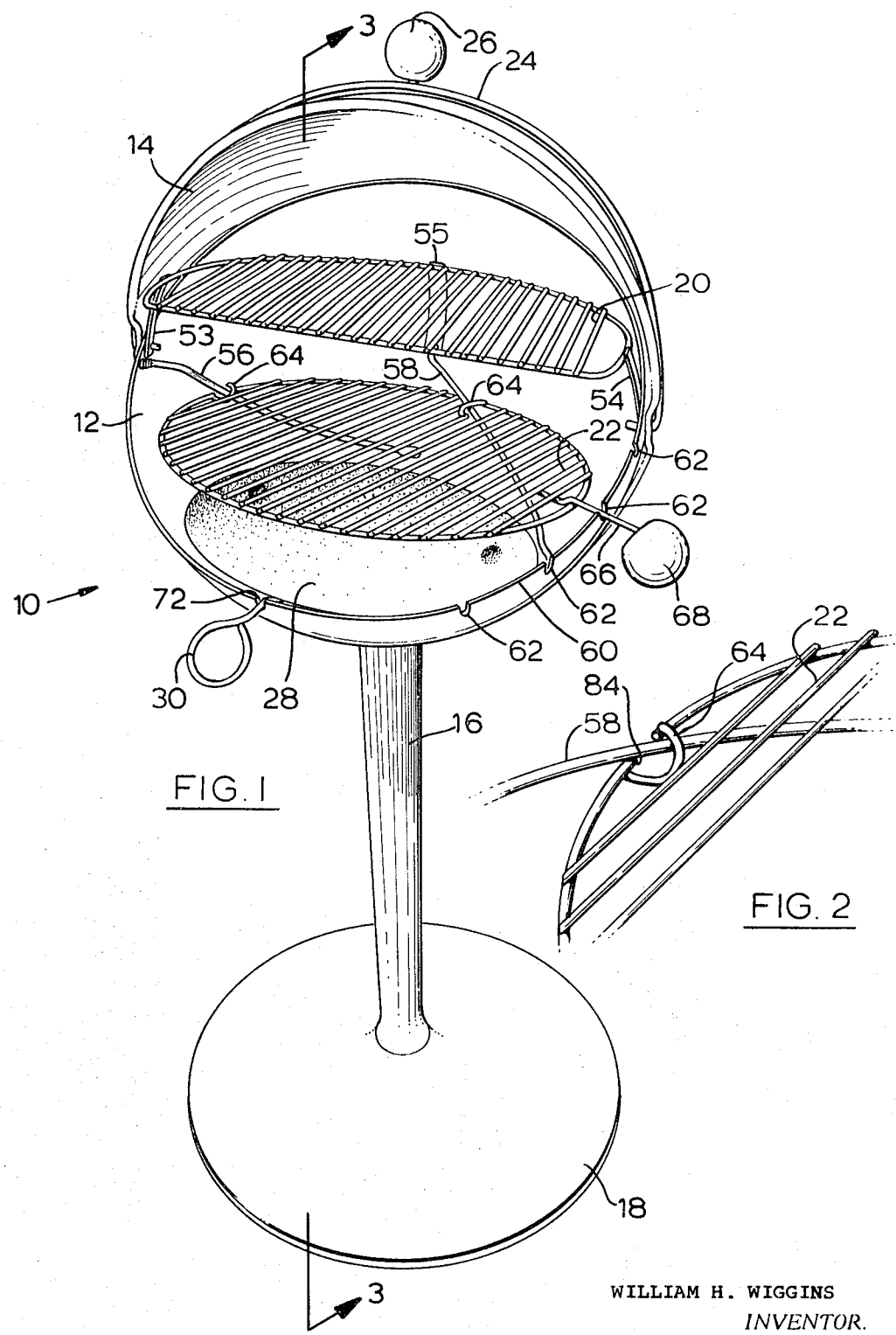
FIG. 1 is a perspective view of the cooking device of this invention.
FIG. 2 is a perspective detail showing the relationship of the lower grill to a ramp used in the raising and lowering of the grill, and to support the same.

The cooking device shown generally at 10 basically comprises two hemispheres, a lower hemisphere 12 and an upper hemispherical hood 14. The lower hemisphere 12 is supported on a pedestal comprising a post or tube 16 and a base 18. The diameters of the upper and lower hemispheres are such that the diameter of the hemispherical hood 14 is greater than the diameter of the lower hemisphere 12, so that the hemispherical hood 14 may swing past at least a portion of the lower hemisphere 12 on a mutual axis therewith in a manner described in greater detail hereafter. The lower hemisphere 12 is rigidly supported and is tilted so that its major axis perpendicular to the plane of the peripheral rim is at an angle to the axis of the supporting pedestal; and so that the angle of the said major axis to the axis of the supporting pedestal and the angle of the plane of the peripheral rim of the hemisphere to the axis of the supporting pedestal are substantially complementary.

It will be noted from FIGS. 1, 5, and 6 that the lower and upper hemispheres 12 and 14 respectively are mounted so that the upper hemispherical hood 14 swings on an axis defined by a mutual diameter of both upper and lower hemispheres. To this end, the cooking device of this invention is such that there is sufficient clearance between the inside surface of the hemispherical hood 14 and the outer surface of the lower hemisphere 12 so that when the upper and lower hemispheres are assembled together the hemispherical hood 14 may swing in a manner as illustrated in FIGS. 5 and 6. When the hood 14 is in the position as shown in FIG. 5, the cooking device may be used as a barbecue for conventional barbecue cooking; and when the hood 14 is in the position shown in FIG. 6, the cooking device may be used as a "kettle" type cooker, i.e. one in which the temperature is relatively constant throughout its interior.

Turning now to the details of the construction of the cooking device of this invention, it will be noted that there are upper and lower grills 20 and 22 respectively provided within the cooking device, and it will be noted that the lower grill 22 may be raised and lowered in elevation. There is also provided on the outside of the hemispherical hood 14 a handle or bail 24 which may conveniently have a knob 26 attached to the middle thereof. A fire pan 28 having a handle 30 is also provided and is dimensioned so as to fit within the lower hemisphere 12 as discussed hereafter.

The assembly of the lower hemisphere 12 to the supporting pedestal provides a tension-compression structure having economy of material together with rigidity. The pedestal comprises a post or tube 16 and a base 18, and extending through the center of the tube 16 is a tension rod 32. It will be noted that the tube is flared at its upper end 34 and its lower end 36; and ideally the flaring of the tube is made so as to continue the line of the lower hemisphere 12 and the base 18 for purposes of appearance. In the usual circumstances, the increased diameter of the tube 16 at top 34 and at bottom 36 is identical so that the tube may be installed either way up, and amounts to about 1.1 to 1.7 times the original diameter of the tube.

The relationship of the lower hemisphere 12 to the axis of the pedestal has been noted above. In a suitable place on the lower hemisphere 12 there is formed a mounting rim 38 which projects outwardly from the hemispherical surface, and which has formed thereon a shoulder 40. The diameter of the shoulder 40 is sufficient to accommodate the flared end of the tube 16 at 34. The mounting rim 38 is formed in the lower hemisphere 12 by embossing or stamping, or other suitable manufacturing procedure. The flare of the mounting rim 38 and the dimensions of the shoulder 40 are such that, when the lower hemisphere 12 is fitted to the flared portion 34 of the tube 16, the line or contour of the outer surface of both is substantially continuous.

In like manner, a mounting rim 42 having a shoulder 44 is embossed or stamped in the base 18 and is similarly dimensioned to cooperate with the lower flared end 36 of the tube 16.

There is placed on the interior surface of the mounting rim 38 a nut 46. Nut 46 may conveniently be hermetically sealed so as to preclude the passage therebeyond of grease drippings and such as may occur in the cooking device, and the nut may conveniently be welded in place. The nut 46 is adapted to receive a threaded end 48 of the tension rod 32. The lower end of the tension rod 32 may conveniently have a handle 49 formed therein by bending the rod away from its axis, and dimples 50 are formed above the handle 49 of sufficient dimension to preclude a spring washer 52 passing beyond the dimples 50 in a direction toward the handle 49. Other means may be used to retain the spring washer 52, such as a C-clip or a brazed ring, and so on. Of course, as noted below it is not necessary that the spring washer 52 be used; but means such as the dimples 50 must be provided to preclude the advance of the entire tension rod 32 towards nut 46 beyond a certain limit as defined by those means interfering either with spring washer 52, when used, or with the interior surface of the mounting rim 42.

During the assembly of the pedestal to the lower hemisphere 12, the spring washer 52 (when used) is placed over the tension rod 32 which is then inserted through a convenient opening in the mounting rim 42 of base 18, through the interior of tube 16, and through an opening in mounting rim 38 of lower hemisphere 12 into nut 46. The rod 32 is turned into the nut 46 by the simple expedient of turning handle 49 so that the threaded end 48 of the tension rod 32 is advanced sufficiently into the nut 46 until further tightening of the rod using the handle 49 is extremely difficult. At such time, the tension rod 32 is in tension between the mounting rims 38 and 44 and the tube 16 is in compression between shoulders 40 and 44. There is thus formed a tension-compression support pedestal.

It should be noted that with the tension-compression support structure described above, the overturning moment of the pedestal becomes that as defined by the diameter of the tube 16 at its widest point; i.e. the diameter of the wider of one of the flared ends 34 and 36 at shoulders 40 and 44, when the flared diameters are not equal. Thus, there is provided a support pedestal having an overturning moment which is greater than that which would be possible had the ends of the tube not been flared, and yet an economy of material is achieved due to the use of the tube 16 having a smaller diameter.

The use of the spring washer 52 provides means to accommodate the thermal expansion of the tension rod 32 in the event that the rod becomes hot because of the close relationship of its upper end 48 to a fire that may be placed within the lower hemisphere 12 of the cooking device 10. Thus, even though the tension rod 32 may be subjected to elongation due to thermal expansion, the rigidity of the pedestal structure may be assured because of the spring washer 52.

It should also be noted that it may be possible to place the nut 46 in base 18 rather than lower hemisphere 12; and that other means to tighten the tension rod 32 into nut 46, apart from handle 49, may be used.

The upper grill 20 is fixedly mounted on straps 53, 54 and 55. The lower ends of straps 53 and 54 fit over the turned-in ends of bail 24 in a manner discussed hereafter, and the lower end of strap 55 may be supported on a pin which is appropriately placed on the inner surface of lower hemisphere 12. The precise manner of support of the straps 53, 54, and 55 is not important to this invention.

The lower grill 22 may be raised or lowered in elevation with respect to the lowermost point of the lower hemisphere 12. The raising and the lowering of the lower grill 22 is accomplished as follows. There is mounted within the lower hemisphere 12 a pair of ramps 56 and 58 which may conveniently be formed of steel rod or other suitable material. The ramps 56 and 58 are welded or snap-fitted over posts placed in the appropriate positions in the inner surface of the lower hemisphere 12; and in any event the ramps 56 and 58 are rigidly held in place. There is formed on the peripheral rim 60 of the lower hemisphere 12 a series of notches 62 which may be spaced apart so that the increase in elevation from one notch to the next adjacent notch is constant. When the notches 62 are so placed, the first two notches downwardly from the right hand uppermost notch as viewed in FIG. 1 are closer together than the last two notches. The grill 22 is supported by a pair of support brackets 64 which are formed in the outer periphery of the grill 62 and which are adapted to contact and ride on the ramps 56 and 58, and by a rod 66 which projects outwardly from the outer periphery of the grill 22 and which is adapted to fit into any of the notches 62. The rod 66 and the support brackets 64 are spaced at 90° intervals around the periphery of the lower grill 22.

It will be noted that each of the ramps 56 and 58 and that portion of the outer periphery 60 of the lower hemisphere 12 in which the notches 62 are formed are such that the loci described by them are substantially equidistantly spaced helices inscribed on the outer surface of a cylinder which is generated by rotating the peripheral rim 60 of lower hemisphere 12 around an axis across the same and then by reducing the diameter of the cylinder so generated by an amount sufficient to accommodate the distance at which the ramps 56 and 58 must of necessity be raised from the inner surface of the lower hemisphere 12.

It will be readily seen that the lower grill 22 may be raised or lowered in elevation merely by grasping the knob 68 which may conveniently be placed at the outer end of rod 66, and by lifting the same so as to clear rod 66 out of engagement with a notch 62 and then rotating the grill 22 about an axis taken substantially through its center so that the rod 66 rides up or down the peripheral rim 60 of the lower hemisphere 12 and the support brackets 64 likewise ride up or down the ramps 56 and 58 until the rod 66 is reengaged in another notch 62. When the rod 66 is engaged with a notch 62, the grill 22 is supported as described above and is substantially horizontally positioned. In this manner, an adjustable spacing of the lower grill 22 above the lowest portion of lower hemisphere 12 (and the fire pan 28 when in place) may be easily accomplished. Any number of notches 62 may be formed in the peripheral rim 60 of the lower hemisphere 12, but it has been found that sufficient latitude in the up-and-down spacing of the lower grill 22 may be accomplished with as few as three or four notches 62.

The fire pan 28 is adapted to fit within the lower portion of lower hemisphere 12; and a plurality of dimples 70 (usually three in number) is spaced around the fire pan so as to support it above the interior surface of the lower hemisphere 12. The dimensions of the dimples 70 are also chosen so that the fire pan 28 sits above and is clear of the nut 46 extending into the lower hemisphere 12 from the mounting rim 38. A notch 72 is formed in the peripheral rim 60 of the lower hemisphere 12 to accommodate the handle 30 of the fire pan 28.

Because the fire pan is removable from the lower hemisphere 12, it is possible to start a fire of charcoal or other suitable material in the fire pan when it is placed out of and away from the lower hemisphere 12. Thus, when starting fluids which often burn with a high flame are used to start a fire, there is no fear of scorching the interior of the cooking device with the flames.

It has been noted that when the fire pan 28 is in operating position in the lower hemisphere 12 it is spaced away from the interior surface of the lower hemisphere. Because of the temperature conditions of the fire pan, a draft can be drawn into the lower hemisphere 14 between it and the fire pan. Thus, there is considerably less likelihood that the material of the lower hemisphere 12 can get so hot as to blister the decorative coating that may be placed on the outside thereof. In addition, the use of the fire pan 28 precludes the necessity of building a fire within lower hemisphere 12, thereby also precluding the necessity of having to lay a proper fire base, clean ashes from the lower hemisphere, etc.

The assembly of the hemispherical hood 14 to the lower hemisphere 12 is readily accomplished by use of the bail 24. It will be noted in FIGS. 1 and 4 that each end of the bail 24 is turned at 72 so as to provide a substantially right-angled hook configuration at the ends. At each side of the lower hemisphere 12 a hole 74 is spaced downwardly a slight distance from the peripheral rim 60. The holes 74 are in an axis of the lower hemisphere 12 which is substantially through its center and which intersects the axis of the pedestal support. The edge of the hemispherical hood 14 is conveniently formed with a rolled rim 76, and near the central axis of the hood 14 there is formed a pair of holes 78 spaced slightly inwardly from the rim 76. The rim 76 may conveniently be shaped as to extend around the hole 78 as shown in FIG. 4. Also, for purposes of stiffening and so as to prevent wear, there may be a washer 80 securely fastened around each hole 78. To assemble the hemispherical hood 14 to the lower hemisphere 12, it becomes obvious that it is merely necessary to spread the ends 72 of bail 24 so that each end 72 enters one each of holes 78 and 74 in hood 14 and lower hemisphere 12 respectively, and then to allow the bail 24 to close to its rest position. Thus, each end 72 of the bail 24 forms a bearing about which the hemispherical hood 14 may rotate, and the axis of rotation of the hood 14 defined by the end 72 of bail 24 is a common, substantially central, diameter of each of the hood 14 and lower hemisphere 12.

For ease of assembly, the straps 53 and 54 supporting the upper grill 20 may also be formed so as to fit over the ends 72 of bail 24 extending into the lower hemisphere 12.

The bail 24 may be used not only for lifting and carrying the cooking device 10, but it may also be used to effect closing or opening of the hood 14 without touching the same. Thus, to open or close the hood 14, it is merely necessary to grasp the handle 26 formed on the bail 24 and to rotate the same so that it interferes with the rim 76 and causes the hood 14 to rotate in the same manner. This is clearly illustrated in FIGS. 5 and 6. When the hemispherical hood 14 is closed as illustrated in FIG. 6, the interference of the rim 76 with the rod 66 extending from lower grill 22 defines the stop position for the closed hood. Because the rod 66 extending from lower grill 22 is positioned along the peripheral rim 60 of the lower hemisphere 12, its position in any of the slots 62 is immaterial, and the closed position of the hemispherical hood 14 is constant regardless of the precise point along rim 76 thereof which interferes with the rod 66.

Because the hemispherical hood 14 is dimensioned so as to rotate about at least a portion of the lower hemisphere 12 without interfering with the same, there is a slight clearance or gap between the outer surfaces of the lower hemisphere 12 along its peripheral rim 50 and the inner surface of the hood 15 when in its closed position as illustrated in FIG. 6. Because the peripheral rim 60 of the lower hemisphere 12 is tilted at an angle to the horizontal, and therefore so is the rim 76 of the hood 14 when in its closed position, a draft is induced through the gap so as to assure a fresh supply of air to the fire burning in fire pan 28. By properly dimensioning the lower hemisphere 12 and the hemispherical hood 14, and thereby the gap formed between them when the hood is closed, the correct draft can be induced for even a very hot fire with many coals burning in fire pan 28. That is to say, the draft induced is sufficient that the fire is not choked, but the draft is not so much as to cause faster burning of the fire formed in the fire pan 28 than is necessary. Economies of fuel consumption can thereby be achieved.

There has been described a cooking device comprising a lower hemisphere which is pedestal-mounted and an upper, hemispherical hood which is rotatable about at least a portion of the lower hemisphere so as to provide a barbecue for open fire cooking on a grill whose elevation with respect to the fire formed in a fire pan placed within the lower hemisphere can be controlled; and which cooking device can also be used as an oven or "kettle" type cooker having substantially constant heat throughout when the hemispherical hood is closed. Support means for a grill to be placed within the cooking device have been taught, which support means also provide the means whereby the elevation of the grill can be set. There has also been discussed a tension-compression pedestal support for the cooking device, which support provides greater rigidity and a greater overturning moment than would be possible with a tube having the same diameter as the tube used in the pedestal support but without the tension-compression assembly as discussed.

The cooking device of the present invention is suitable for use out of doors, and because of the widespread increase in popularity of barbecue cooking, the cooking device is designed so as to provide an essentially safe barbecue for use even on apartment balconies and patios. The cooking device of this invention may also be used indoors, when a proper fire has been prepared, and in a room providing sufficient oxygen to maintain the fire. Further, for indoor use, or for tabletop use, the cooking device may be assembled without the tube 16 and tension rod 32, thereby giving a short model with the lower hemisphere 12 assembled directly to the base 18.

It should also be noted that the support brackets 64 may be so shaped that the portion thereof which contacts either of ramps 56 and 58 is substantially diametric with respect to the grill 22, thus substantially diminishing chances of the grill 22 binding on either of ramps 56 and 58 during elevation changes of the grill. Also, the portion of the outer rim 82 of grill 22 on the side of each of support brackets 64 which is relatively lower with respect to either ramp 56 or 58 than the portion of rim 82 on the other side of the respective support bracket 64 may extend beyond the support bracket under the ramp as shown at 84 in FIG. 2. When the rim 82 of grill 22 is so designed, the grill cannot be lifted upwardly away from the ramps 56 and 58. Rather, the grill must be turned to its highest elevation along ramps 56 and 58 (and peripheral rim 60) and then slipped over the end of the respective ramps.

The ends of tube 16 may be left unflared, provided that the shoulders 40 and 44 on mounting rims 38 and 42 respectively are dimensioned to mate with the unflared ends. The tension-compression support pedestal remains the same as noted above, except that the overturning moment of the pedestal is defined by the diameter of the tube per se.

When the length of tube 16 and the diameter and height of base 18 are properly dimensioned, the cooking device of this invention may be packaged in the unassembled condition in a box whose dimensions are very slightly greater than those of the hemispherical hood 14; because the lower hemisphere 12 will fit into the hemispherical hood 14, the base 18 into the lower hemisphere 12, along with the grills 20 and 22, and the tube 16 will lie beside the hood 14 in the box.

The spring washer 52 may be welded or brazed in place on the underside of mounting rim 42 in base 18; or the spring washer 52 may be replaced by a reinforcing plate or washer in the same position when necessary to preclude bulging of the upper face of mounting rim 42 as tension is applied to the tension rod 32.

The embodiments of the invention in which an exclusive property or privilege is claimed are defined as follows:

1. In combination, an article of manufacture, a pedestal support means, and a base; said pedestal support means comprising:

a thin-walled tube having each end flared outwardly, said tube having substantially constant wall thickness throughout its length and having substantially constant diameter throughout its length except at its flared ends; said thin-walled tube having substantially greater length than its diameter and being capable of withstanding axial compression forces;

and a tension member adapted to extend through the length of said tube from said base to said article of manufacture, and having at least one end thereof threaded;

each of said base and said article of manufacture having formed thereon a mounting rim having a shoulder adapted to mate with one of said flared ends of said tube, respectively, so that when one of said flared ends is mated with its respective mounting rim and shoulder, the contour of the outer surface of the flare is substantially continuous onto the outer surface of said mounting rim;

first threaded receiving means placed in one of said base and said article of manufacture to receive said at least one threaded end of said tension member;

and means adapted to preclude axial movement of said tension member within said tube from one of said base and said article of manufacture toward said first threaded receiving means in the other of said base and said article of manufacture;

whereby when said tension means is extended through the length of said tube from one of said base and said article of manufacture toward the other of said base and said article of manufacture so that said at least one threaded end of said tension member is received in said first threaded receiving means, and said threaded end is advanced into said threaded receiving means, tension is developed in said tension member between said first threaded receiving means and said means to preclude axial movement of said tension member towards said first threaded receiving means, and compression is developed in said thin-walled tube between said flared ends mated respectively with said shoulders formed in said mounting rims in each of said base and said article of manufacture.

2. The pedestal support means of claim 1 wherein said means to preclude axial movement of said tension member toward said first threaded receiving means is formed near the end of said tension member opposite said at least one threaded end, and is adapted for an interference fit with the mounting rim formed in the other of said base and said article of manufacture in which said first threaded receiving means is not placed.

3. The pedestal support means of claim 2 further comprising compression means adapted to fit over said tension member between said means to preclude axial movement thereof and said mounting rim formed in the other of said base and said article of manufacture in which said first threaded receiving means is not placed.

* * * * *